(12) United States Patent
Hernandez

(10) Patent No.: US 7,222,607 B2
(45) Date of Patent: May 29, 2007

(54) DSP-BASED ENGINE KNOCK DETECTION INCLUDING KNOCK SENSOR AND CIRCUIT DIAGNOSTICS

(75) Inventor: Claudio A. Hernandez, Farmington Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/198,219

(22) Filed: Aug. 5, 2005

(65) Prior Publication Data
US 2007/0028893 A1    Feb. 8, 2007

(51) Int. Cl.
F02P 5/00    (2006.01)
F02P 5/06    (2006.01)

(52) U.S. Cl. .............................. 123/406.37; 123/406.38

(58) Field of Classification Search ........... 123/406.21, 123/406.29, 406.34, 406.37, 406.38
See application file for complete search history.

(56) References Cited

U.S. PATENT DOCUMENTS

| | | | | |
|---|---|---|---|---|
| 4,384,473 A * | 5/1983 | Brandt | ...................... | 73/35.06 |
| 4,444,043 A * | 4/1984 | Hattori et al. | ............. | 73/35.07 |
| 4,690,116 A * | 9/1987 | Takahashi | .............. | 123/406.16 |
| 5,460,031 A * | 10/1995 | Fujishita et al. | ........... | 73/35.03 |
| 5,535,722 A * | 7/1996 | Graessley et al. | ...... | 123/406.21 |
| 5,598,822 A * | 2/1997 | Fujishita et al. | ....... | 123/406.38 |
| 2004/0084025 A1* | 5/2004 | Zhu et al. | ................... | 123/435 |

\* cited by examiner

*Primary Examiner*—Mahmoud Gimie
(74) *Attorney, Agent, or Firm*—Christopher DeVries

(57) ABSTRACT

A knock detection system for a spark-ignition engine includes a knock sensor that is responsive to vibration of the engine and that generates a knock signal. A first module calculates a knock energy based on the knock signal and a second module calculates a knock intensity based on the knock energy. A third module regulates a spark timing of the engine based on the knock intensity.

28 Claims, 8 Drawing Sheets

DSP-BASED ENGINE KNOCK DETECTION INCLUDING KNOCK SENSOR AND CIRCUIT DIAGNOSTICS

FIELD OF THE INVENTION

The present invention relates to engine knock detection, and more particularly to knock detection systems including a knock sensor.

BACKGROUND OF THE INVENTION

Vehicles can include an internal combustion engine that generates drive torque to drive wheels. More specifically, the engine draws in air and mixes the air with fuel to form combustion mixtures. The combustion mixtures are compressed within cylinders and are combusted to drive pistons that are slidably disposed within respective cylinders. The pistons rotatably drive a crankshaft to transfer drive torque to a driveline and ultimately to the wheels.

When the engine misfires, the combustion mixture of a particular cylinder combusts at an undesired time. More specifically, the temperature and pressure of the unburned air/fuel mixture within the cylinder exceeds a critical level and causes the gases to auto ignite. This results in engine knock and produces a shock wave that generates a rapid increase in cylinder pressure. Damage to pistons, rings and exhaust valves can occur if sustained heavy knock occurs. Additionally, engine knock causes undesired vibration and driveline oscillations.

Engine control systems may include misfire detection systems and/or knock detection systems to determine when the engine misfires. In this manner, the engine control system can regulate engine operation to inhibit engine misfire and improve engine performance and vehicle drivability.

Traditional knock detection systems include a knock sensor and a dedicated knock detection chip or application specific integrated circuit (ASIC) to process the knock sensor signal and calculate the engine knock intensity. An individual knock sensor and knock ASIC can be used to detect knock from each cylinder. The knock ASIC usually includes amplifiers, filters, rectifiers, integrators, A/D converters, sample and hold circuits and/or other analog circuits. This hardware is expensive, difficult to upgrade and calibrate and varies from manufacturer to manufacturer.

SUMMARY OF THE INVENTION

Accordingly, the present invention provides knock detection system for a spark-ignition engine. The knock detection system includes a knock sensor that is responsive to vibration of the engine and that generates a knock signal. A first module calculates a knock energy based on the knock signal and a second module calculates a knock intensity based on the knock energy. A third module regulates a spark timing of the engine based on the knock intensity.

In another feature, the knock detection system further includes a noise module that estimates a noise value. The second module calculates the knock intensity based on the noise value.

In another feature, the knock detection system further includes a diagnostic module that selectively generates one of a knock sensor fault and a knock circuit fault based on the knock energy.

In other features, the knock detection system further includes a Fast Fourier Transform (FFT) module that generates a frequency signal based on the knock signal. A power module generates a power signal based on the frequency signal. The knock energy is based on the power signal.

In another feature, the knock detection system further includes a window module that generates a window signal based on a rotational position of a crankshaft of the engine. The knock energy is calculated based on the window signal.

In another feature, the second module determines a knock difference between the knock energy and a noise energy and calculates the knock intensity as a difference between said knock ratio and a knock intensity threshold.

In still another feature, the second module determines a knock ratio between the knock energy and a noise energy and calculates the knock intensity as a difference between the knock ratio and a knock intensity threshold.

In yet another feature, the second module determines the knock intensity as a difference between the knock energy and an energy threshold.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
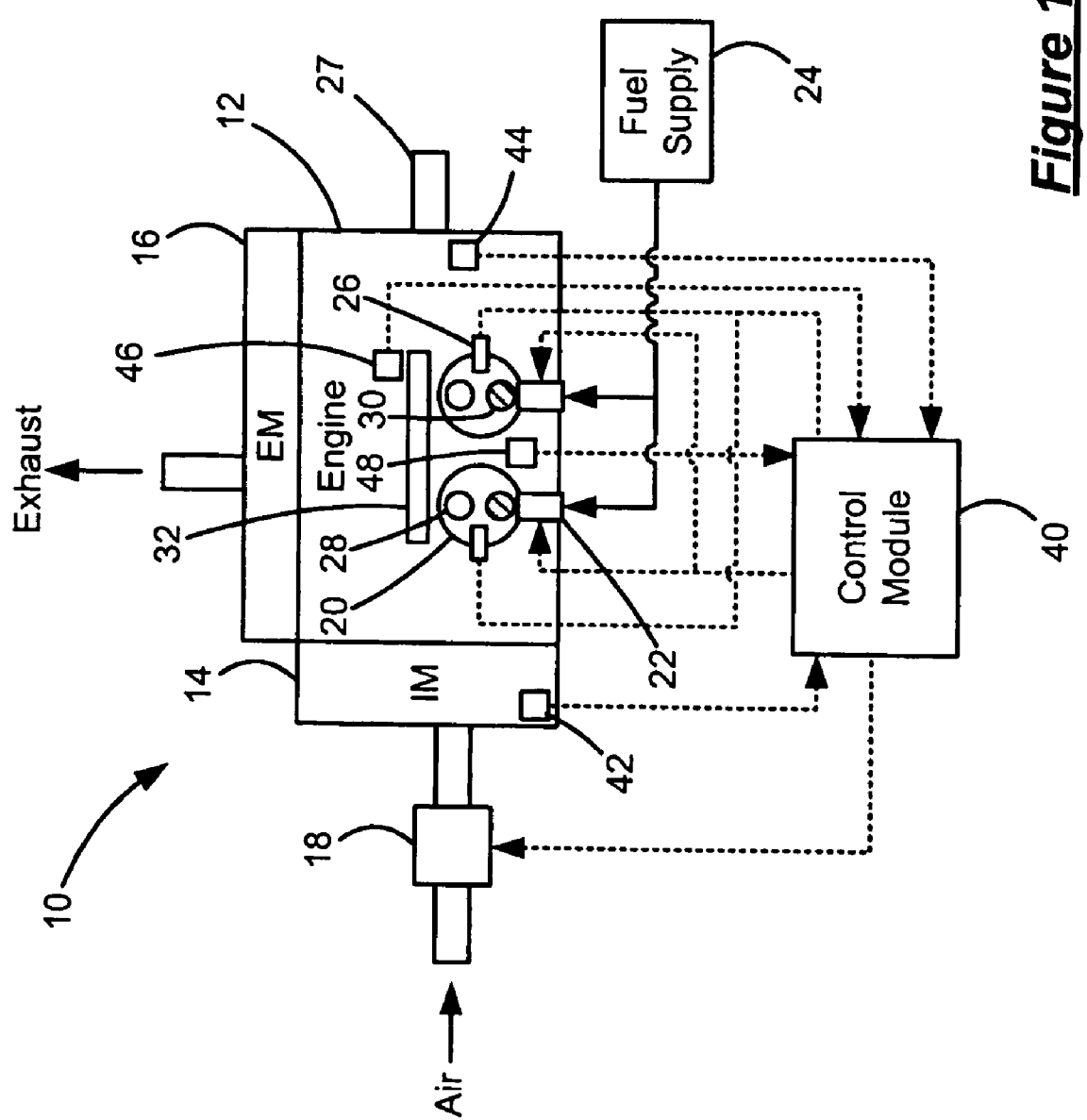
FIG. 1 is a schematic illustration of an exemplary engine system including a digital signal processing (DSP)-based knock detection system according to the present invention.

The following description of the preferred embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary engine system 10 is schematically illustrated and includes an engine 12, an intake manifold 14 and an exhaust manifold 16. Air is drawn into the intake manifold 14 through a throttle 18. The air is directed into cylinders 20 and is mixed with fuel therein. The fuel is injected into the cylinders 20 by fuel injectors 22 that communicate with a fuel supply 24. Spark plugs 26 initiate combustion of the air/fuel mixture in their respective cylinders 20 and combustion exhaust exits the cylinders 20 and engine 12 through the exhaust manifold 16. Although only two cylinders 20 are illustrated, it can be appreciated that the present invention can be implemented with an engine having more or fewer cylinders 20.

The combustion process drives pistons (not shown) that are slidably supported within the cylinders 20 and which, in turn rotatably drive a crankshaft 27. The engine 12 further includes intake and exhaust valves, 28,30 respectively, associated with each cylinder 20. The intake and exhaust valves 28,30 respectively regulate air intake into the cylinders 20 and exhaust of combustion gases from the cylinders 20. An intake camshaft 32 is rotatably driven by the crankshaft 27 and regulates opening and closing of the intake valves 28. Although not illustrated, the engine 12 can further include an exhaust camshaft that is rotatably driven by the crankshaft 27 and that regulates opening and closing of the exhaust valves 30.

A control module 40 regulates engine operation based on the DSP-based knock detection of the present invention. More specifically, the control module 40 regulates spark timing relative to the piston position in the cylinder based on the presence and intensity of engine knock. A manifold absolute pressure (MAP) sensor 42 is responsive to a pressure within the intake manifold 14 and generates a MAP signal based thereon, which is communicated to the control module 40. An engine speed sensor 44 is responsive to rotation of the crankshaft 27 and generates a crankshaft signal based thereon, which is communicated to the control module 40. Similarly, a camshaft sensor 46 is responsive to rotation of the camshaft 32 and sends a camshaft signal to the control module 40. The control module 40 generates a window signal based on the crankshaft signal and the camshaft signal, as discussed in further detail below.

A knock sensor 48 is responsive to vibration of the cylinders and generates a knock signal based thereon and which is communicated to the control module 40. The control module 40 processes the knock signal to detect engine knock using the DSP-based knock detection system of the present invention. Although a single knock sensor 48 is illustrated, it is anticipated that multiple knock sensors 48 can be implemented. For example, two knock sensors can be implemented in a 6 or 8 cylinder engine.

Figure 2:
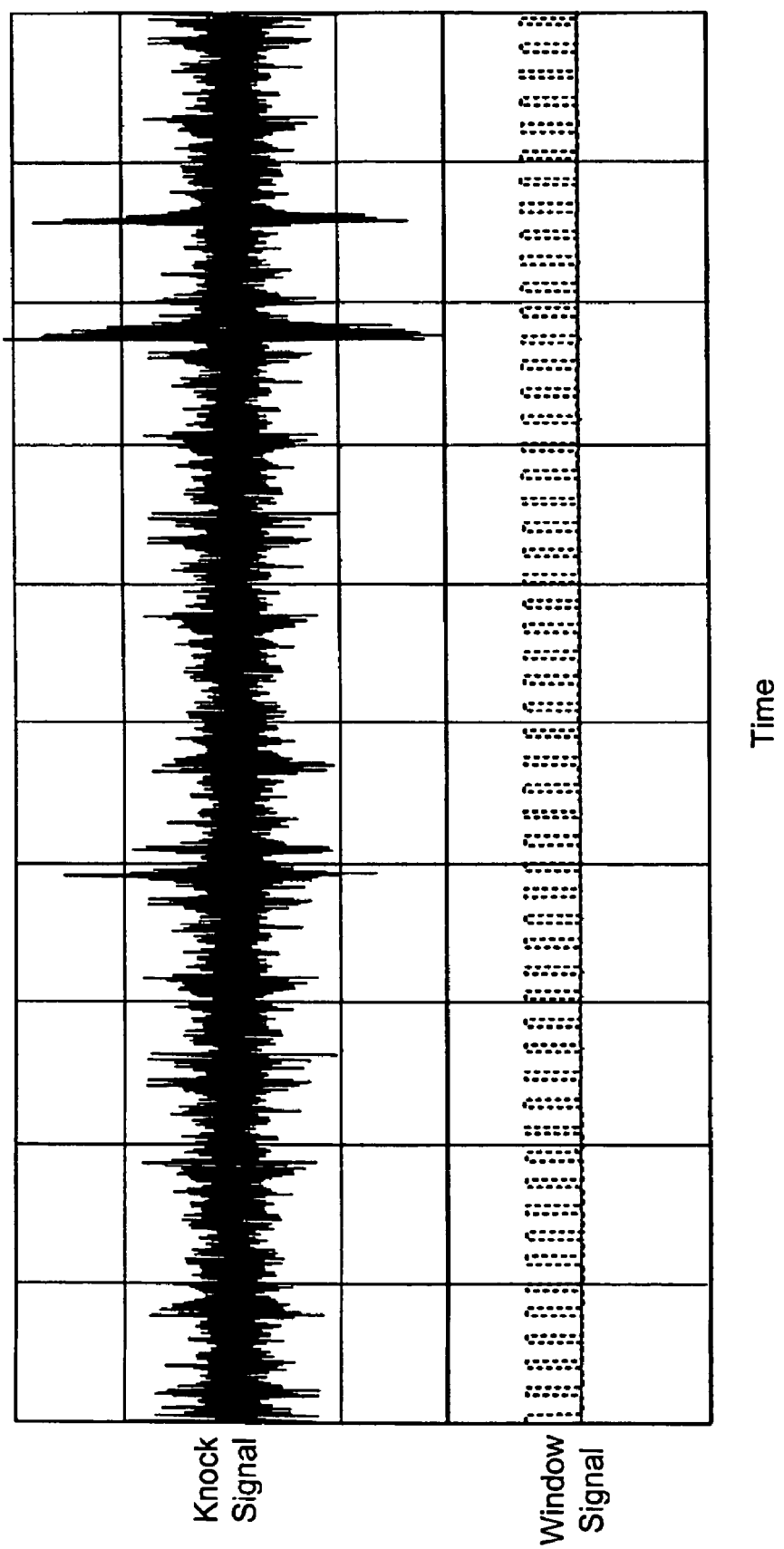
FIG. 2 is a graph illustrating an exemplary knock sensor signal and an exemplary window signal generated by respective sensor of the knock detection system.

Referring now to FIG. 2, a graph illustrates an exemplary knock signal and an exemplary window signal over an exemplary time period. The window signal is determined based on the camshaft signal and the crankshaft signal and is generally provided as a step-wave form. The window signal indicates the time periods during which knock detection occurs. More specifically, the high side of the window signal indicates the time before and after a particular cylinder crosses top dead center (TDC) or the time at which knock detection is desired (e.g., between approximately 4° from TDC to approximately 70° after TDC for an exemplary engine). For example, in the case of a 4 cylinder engine, the first step-wave corresponds to the first cylinder of the firing order and the second step-wave corresponds with the second cylinder of the firing order and so on. The fifth step-wave again corresponds with the first cylinder of the firing order and the step-waves respectively repeat.

The DSP-based knock detection system of the present invention detects engine knock based on the knock signal and the window signal. One of two approaches are implemented: time-domain based and frequency-domain based. These two approaches differ not only on the domain in which the processing and analysis of the knock signal is performed, but also on the signal processing functions used in the detection algorithm as described in the following sections. For both approaches, the DSP-based knock detection system includes knock sensor and circuit diagnostics.

Figure 3:
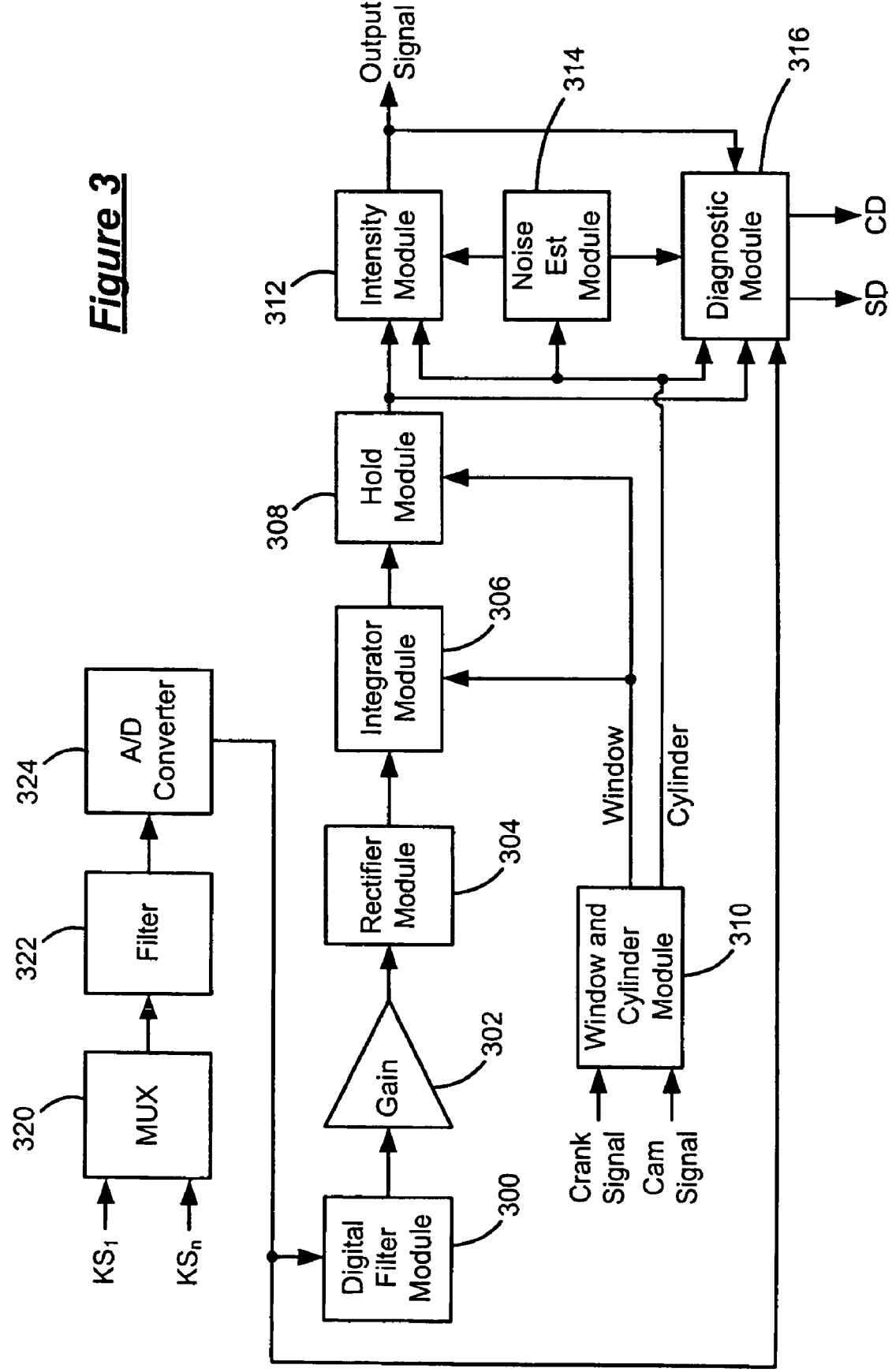
FIG. 3 is a schematic illustration of exemplary modules that execute a time-domain knock detection according to the present invention.

Referring now to FIG. 3, in the time-domain based approach all of the processing and analysis of the knock signal are performed in the time domain. Exemplary modules that execute the time-domain DSP-based knock detection include: a digital filter module 300 (e.g., a band pass filter (BPF)), a gain module 302, a rectifier module 304, an integrator module 306, a hold module 308, a window and cylinder module 310, an intensity module 312, a noise estimation module 314 and a diagnostic module 316. Additional modules can be implemented including, but not limited to, a multiplexer 320, a filter 322 and an analog to digital (A/D) converter 324.

In the case of multiple knock sensors the multiplexer 320 forwards one of the multiple knock signals ($KS_1$ ... $KS_n$) based on a signal input. The signal input indicates which knock signal to forward based on which cylinder is fired. The knock signal is forwarded to the filter 322, which is preferably provided as a low-pass filter. The filter 322 filters out any erroneous, high-frequency components of the knock signal. The A/D converter 324 converts the filtered analog signal to a digital signal and outputs the digital signal to the digital filter module 300.

The digital filter module 300 is preferably a BPF that can be implemented by using an infinite impulse response filter (IIR) or a finite impulse response filter (FIR). The behavior of an IIR filter can be described by the following difference equation:

$$y = \sum_{n=0}^{m} b_n x_n(k-n) - \sum_{n=1}^{m} a_n y_n(k-n)$$

where y is the output of the filter, x is the filter input (i.e., the knock signal), m is the number of filter stages or taps, k is the knock sensor sample number (1, 2, 3 ...), and $a_n$, and $b_n$ are the filter coefficients. An m-tap FIR filter can be represented by the following difference equation:

$$y = \sum_{n=0}^{m} b_n x_n(k-n)$$

The frequency band of the BPF is based on the particular application. In the case of knock detection an exemplary range is from 4 kHz to 22 kHz (i.e., frequencies less than 4 kHz and greater than 22 kHz are filtered out). The frequency band can be easily configured during the design stage and/or calibration stage. The FIR filter includes parameters including, but not limited to, a plurality of coefficients ($b_n$), a band pass frequency and a number of knock sensor samples (k). Exemplary values of these parameters include 32 coefficients, 4 kHz–22 kHz and 256 samples, respectively. It is appreciated that accurate results can be achieved with filters designed with different number of coefficients, different band pass frequencies and number of samples. For example, lower number of samples (e.g., 128 or less) may be used however, the resolution of the estimated knock intensity may be diminished. Similarly, a higher number of samples (e.g., 512 or greater) can be used, however a higher number of samples impacts the processing speed.

The gain module 302 amplifies the filtered signal from the digital filter module 300 and forwards the amplified signal to the rectifier module 304. The absolute or full-wave rectifier module 304 can be characterized by the following equation:

$$|y_a|=|y|$$

where $y_a$ is the output of the rectifier and y is the rectifier input (i.e., the BPF output) and || is the absolute value operation.

The integrator module 306 receives the rectified knock signal from the rectifier module 304 and the window signal from the window and cylinder module 310. The integrator module 306 generates a knock energy signal that is defined by the following exemplary equation:

$$y_o(n)=y_o(n-1)+T^*y_a(n)$$

where $y_o(n)$ is the output of the integrator for the nth sample of the integrator input $y_a$ (i.e., output of the rectifier module 304), $y_o(n-1)$ is the integrator output for the $(n-1)^{th}$ sample of the integrator input $y_a$, $y_a(n)$ is the output of the rectifier module 304 for sample n of the knock sensor input and T is the sampling period. Different sampling frequencies can be used (e.g., 100,000 samples/sec and 200,000 samples/sec). For example, at engine speeds below 6000 RPM, a sampling frequency of 100,000 samples/sec is sufficient. However, a higher sampling frequency at a higher engine speed will provide improved resolution of the estimated knock. The sampling period is calculated as the inverse of the sampling frequency or T=1/100,000 sec.

The hold module 308 receives the integrated knock signal and the window signal and provides a memory location for intermediate knock signal values. The hold module 308 forwards the integrated knock signal to the intensity module 312 and the diagnostic module 316 based on the window signal. Knock intensity is calculated from the final (i.e., maximum) value of the integrator at the end of the knock window (e.g., from 4° before TDC to 70° after TDC for an exemplary engine). There is no knock intensity update while the integrator module 306 is integrating the knock signal within the knock window. Knock intensity can be estimated by using one of a knock ratio approach or a knock difference approach. Knock ratio (KR) is calculated as follows:

$$KR=(\text{knock } y_o)/(\text{noise } y_o);$$

where knock $y_o$ is the integrator module output at end of knock window and noise $y_o$ is the integrator module output at end of noise window.

Knock intensity (KI) is calculated according to the following equation:

$$KI=KR-KI_{THR}$$

where $KI_{THR}$ is a knock intensity threshold that is determined based on engine speed and engine load. It is anticipated that $KI_{THR}$ can be determined from a look-up table based on engine speed and load or can be calculated from an equation using engine speed and load as inputs. The look-up table or equation can be developed from experimental data generated by vehicle tests at different engine speeds and loads and normal operation of the engine (i.e., no knock conditions).

The knock ratio approach requires that two knock windows or that two different portions of the data (i.e., two data sets) be used to calculate both the noise (when no knock is expected) and the knock signal (the portion of the data that contains knock activity or when knock activity is expected). These two different data sets result in two different integrator outputs, "knock $y_o$" and "noise $y_o$", which are the final values of the integrator module 306 at the end of each data set.

In the knock difference approach, the knock difference (KD) is calculated as follows:

$$KD=\text{knock } y_o-\text{noise } y_o$$

Knock intensity is calculated according to the following equation:

$$KI=KD-KI_{THR}$$

Either approach provides sufficient results, however, the knock difference approach is easier to implement.

The noise estimation module 314 determines noise $y_o$ based on a cylinder signal generated by the window and cylinder module 310. More specifically, noise $y_o$ is determined from a look-up table based on the cylinder signal. The engine noise (noise $y_o$) look-up table is designed based on experimental data by running vehicle tests at different engine speeds and loads and recording the average integrator output. Preferably, only data from normal engine operation (i.e., no knock activity) is used to estimate the noise. This engine noise is saved as the base line engine noise and can be updated in every engine cycle to account for transients and system performance variation. The DSP-based knock detection system uses one knock window to collect both sets of data (i.e., the data used for noise estimation/update and the data for knock signal calculation).

The intensity module 312 generates an output or knock intensity signal that is used by the control module 40 to regulate engine operation. More specifically, the control module 40 regulates engine spark to inhibit engine knock based on the output signal.

The diagnostic module 316 monitors operation of the DSP-based knock detection system and generates a sensor diagnostic signal (SD) and a circuit diagnostic signal (CD) to check for knock circuit and knock sensor short to power or ground as well as open circuit faults. A short to power or ground as well as an open circuit will result in the integrator module output to be below or above a normal knock sensor signal range. Therefore, the diagnostic module 316 uses the outputs from the hold module (i.e., the delayed integrator output), the raw knock sensor signal (i.e., before the digital filter), the average noise from the noise estimation module, the knock intensity (i.e., output signal) and the cylinder identification (i.e., the cylinder signal) to decide whether the knock sensor signal falls within normal range and to diagnose the fault if it does not.

A short to ground results in the integrator output reading below the normal range. At each engine operating condition, the knock sensor outputs an average signal even if there is no engine knock. This average knock sensor signal (i.e., noise) is used to detect faults according to the following logic:

```
If (KS_CurrentCalculation < KS_THRLOW)
    Knock Circuit and/or Knock Sensor = FAIL.
else
    Knock Circuit and/or Knock Sensor = PASS
``` where $KS_{CurrentCalculation}$ is the current output from the sample and hold block 308 for the knock sensor diagnostic or is the current output from the noise estimation module 316 for the knock circuit diagnostic and $KS_{THRLOW}$ is a lower threshold that is obtained experimentally and can be updated over the life of the engine.

A short to power results in the knock sensor signal being above the normal range. The diagnostic block uses inputs from the hold module, $KS_{nDIG}$, the average noise and the output signal (i.e., knock intensity) and the A/D converter signal ($KS_{nDIG}$) to detect a short to power. The diagnostic module implements the following logic to detect a short to power:

```
If ((integrator output > KS_THRHI) And (KS_nDIG > KS_THRHInDIG))
    Knock Circuit and/or Knock Sensor = FAIL
else
    Knock Circuit and/or Knock Sensor = PASS
``` where $KS_{THRHI}$ and $KS_{THRHInDIG}$ are determined based on engine operating conditions. More specifically, $KS_{THRHI}$ and $KS_{THRHInDIG}$ are determined from a look-up table based on engine speed and mass air flow (MAF).

Because of the digital filter module 300, which removes constant or low frequency components, the knock sensor or knock circuit may have a short to power (i.e., constant high voltage which is removed by the filter) and the output of the integrator might be less than $KS_{THRHI}$. However, because the diagnostic module 316 also receives $KS_{nDIG}$, as well as the output signal from the intensity module 312, a short to power fault can be detected. The diagnostic module 316 makes use of the information from different parts of the DSP-based knock detection system to successfully distinguish between normal and faulty operations of the knock circuit or knock sensor.

If a fault is detected, the diagnostic module 316 determines whether the fault is present when reading each knock sensor, in the case of multiple knock sensors. If the fault is present when reading each knock sensor, the diagnostic module 316 classifies the fault as a "circuit fault" because it is extremely unlikely that each sensor exhibits the same fault. If the fault is detected when reading just one knock sensor, the diagnostic module 316 classifies the fault as a specific sensor fault.

Figure 4:
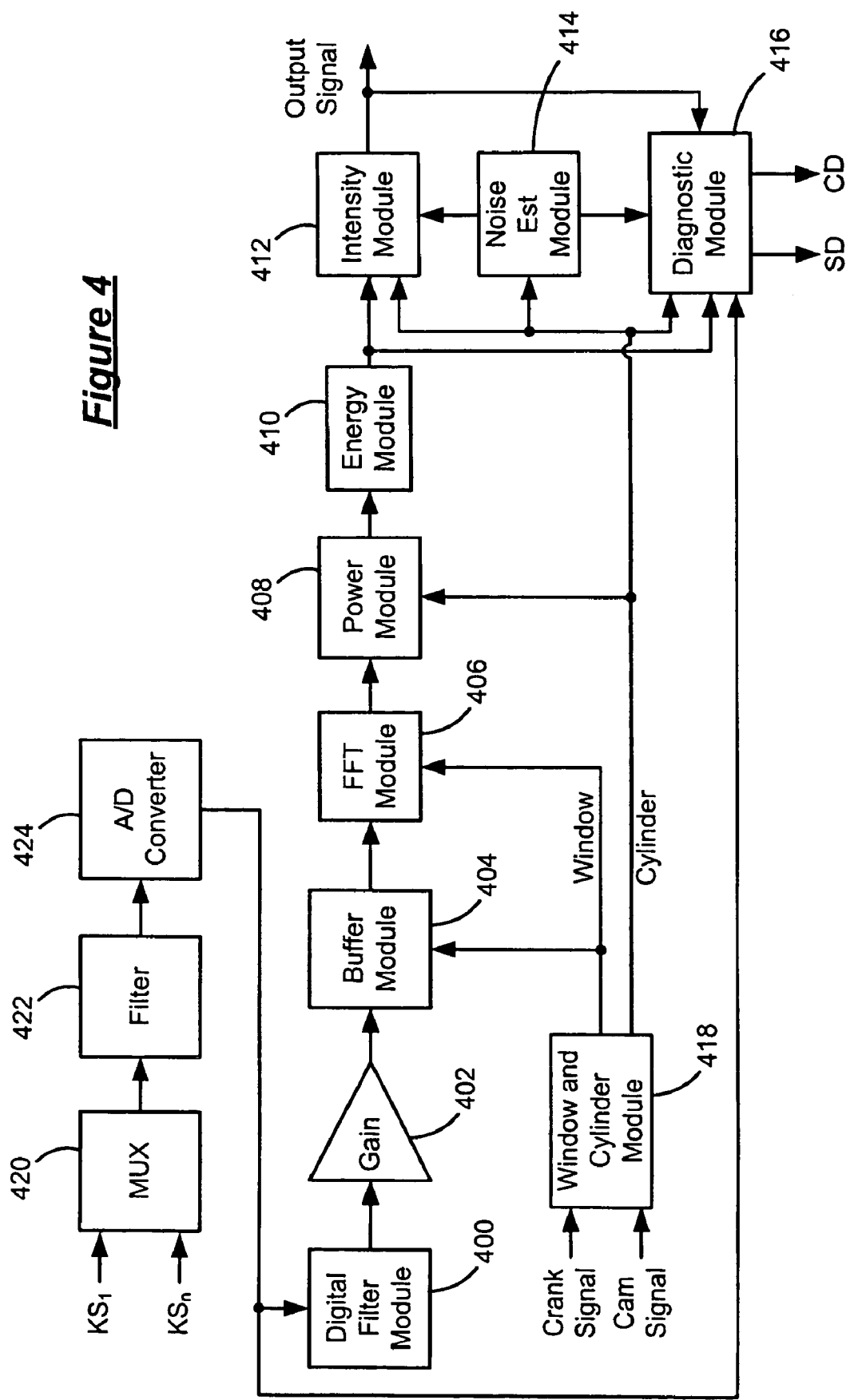
FIG. 4 is a schematic illustration of exemplary modules that execute a frequency-domain knock detection according to the present invention.
Figure 5:
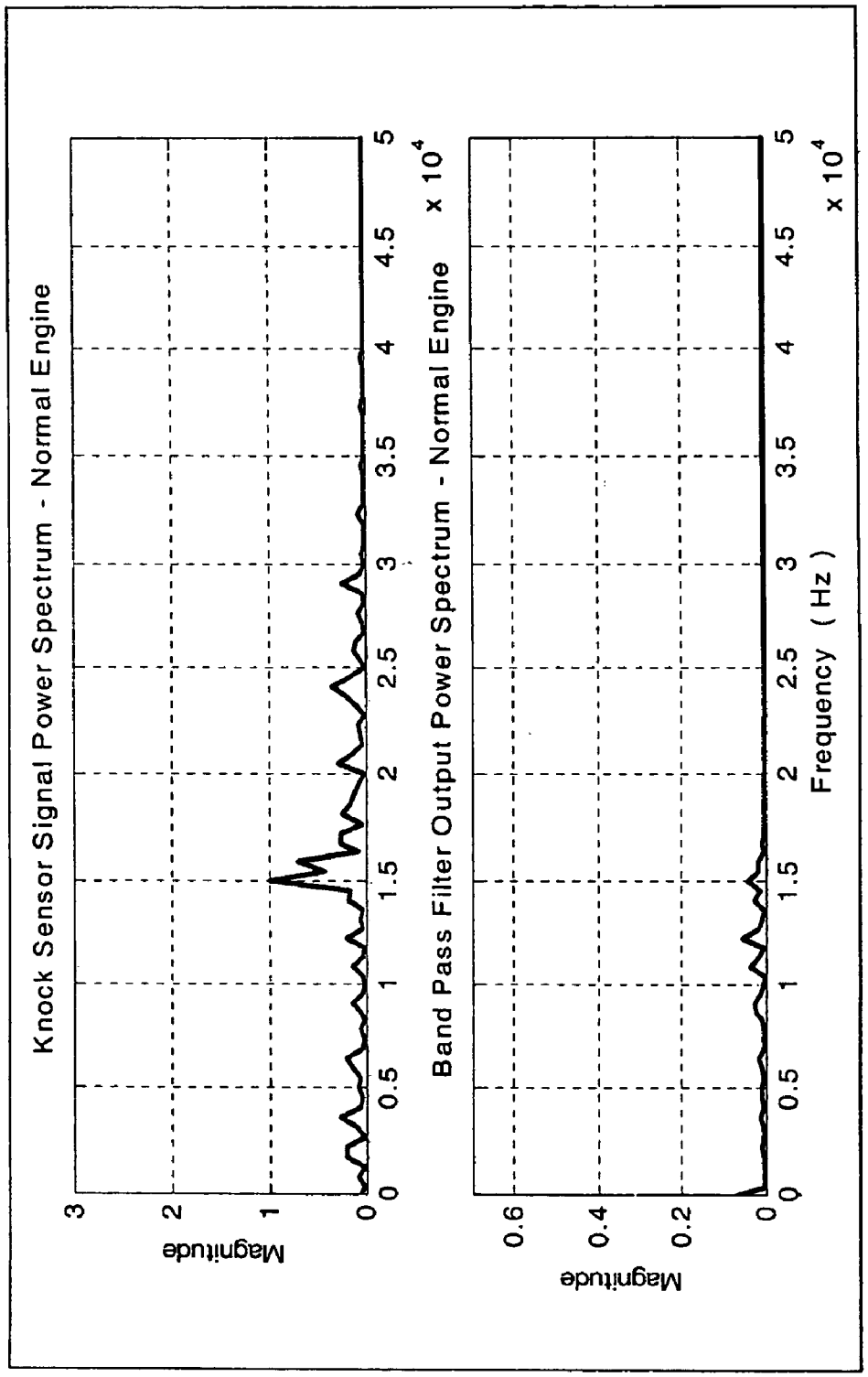
FIG. 5 is a graph illustrating an exemplary knock sensor signal power spectrum and a corresponding exemplary band-pass filter (BPF) output power spectrum for a normal engine.
Figure 6:
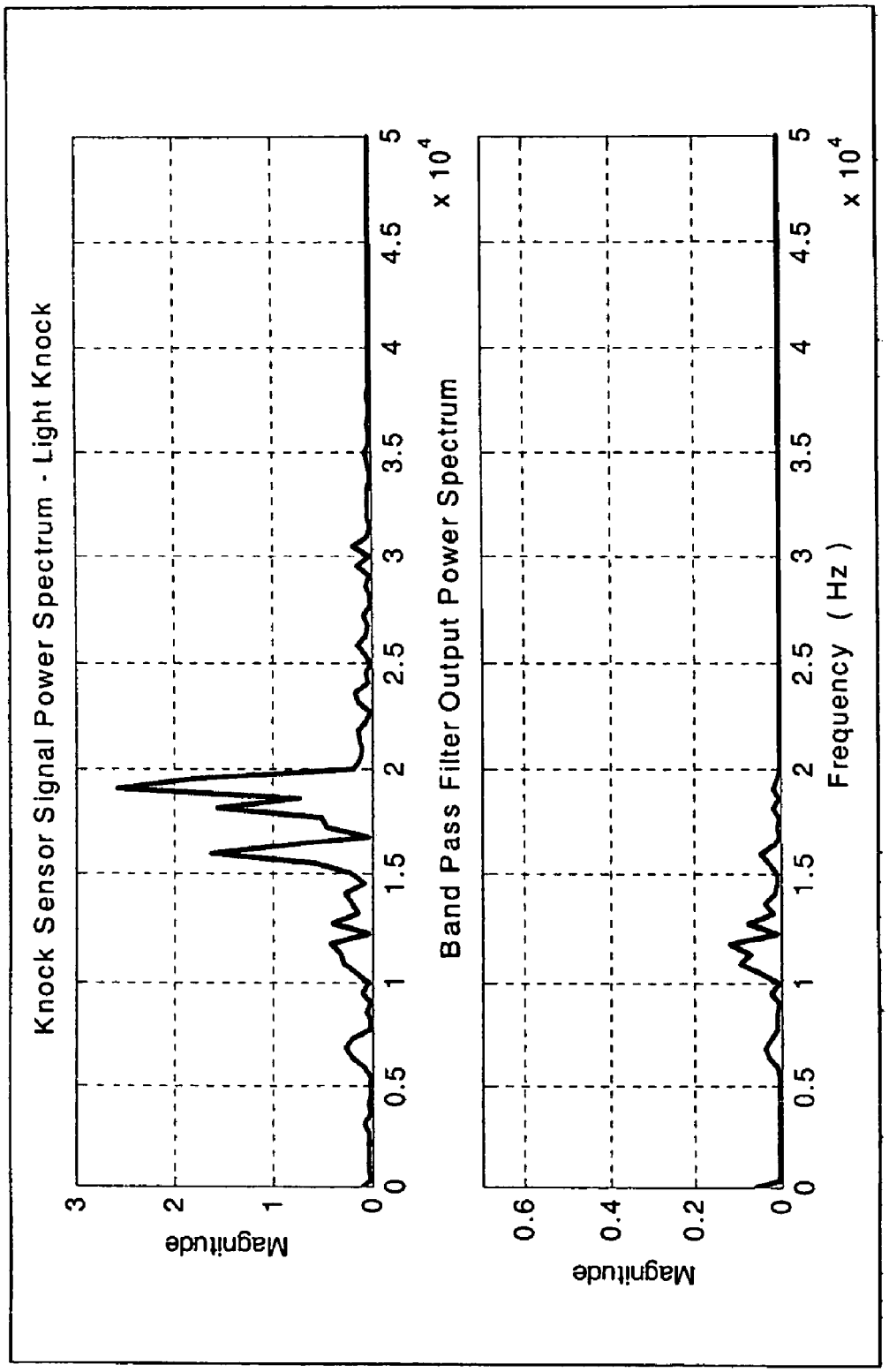
FIG. 6 is a graph illustrating an exemplary knock sensor signal power spectrum and a corresponding exemplary BPF output power spectrum for an engine exhibiting light knock.
Figure 7:
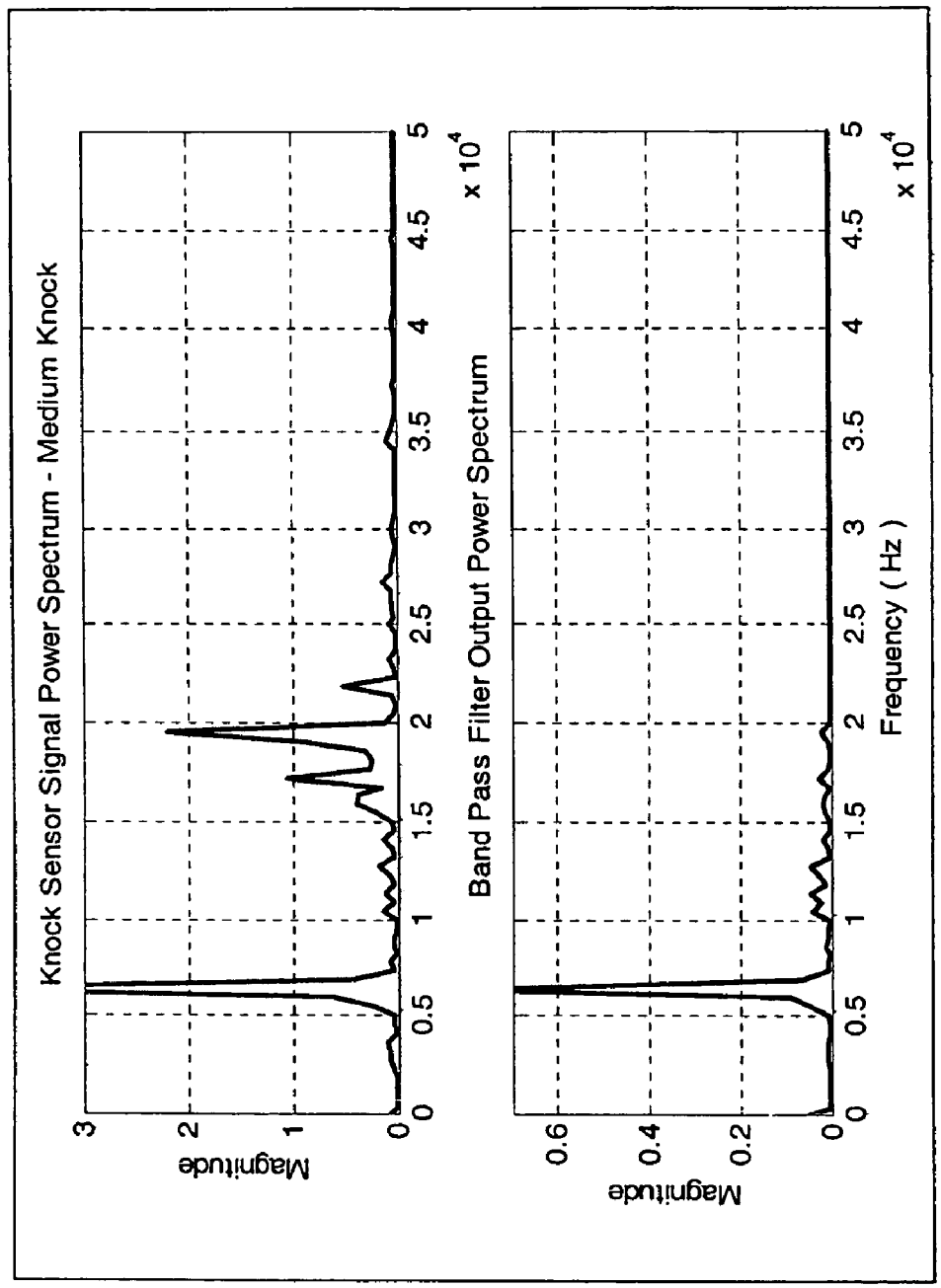
FIG. 7 is a graph illustrating an exemplary knock sensor signal power spectrum and a corresponding exemplary BPF output power spectrum for an engine exhibiting medium knock.
Figure 8:
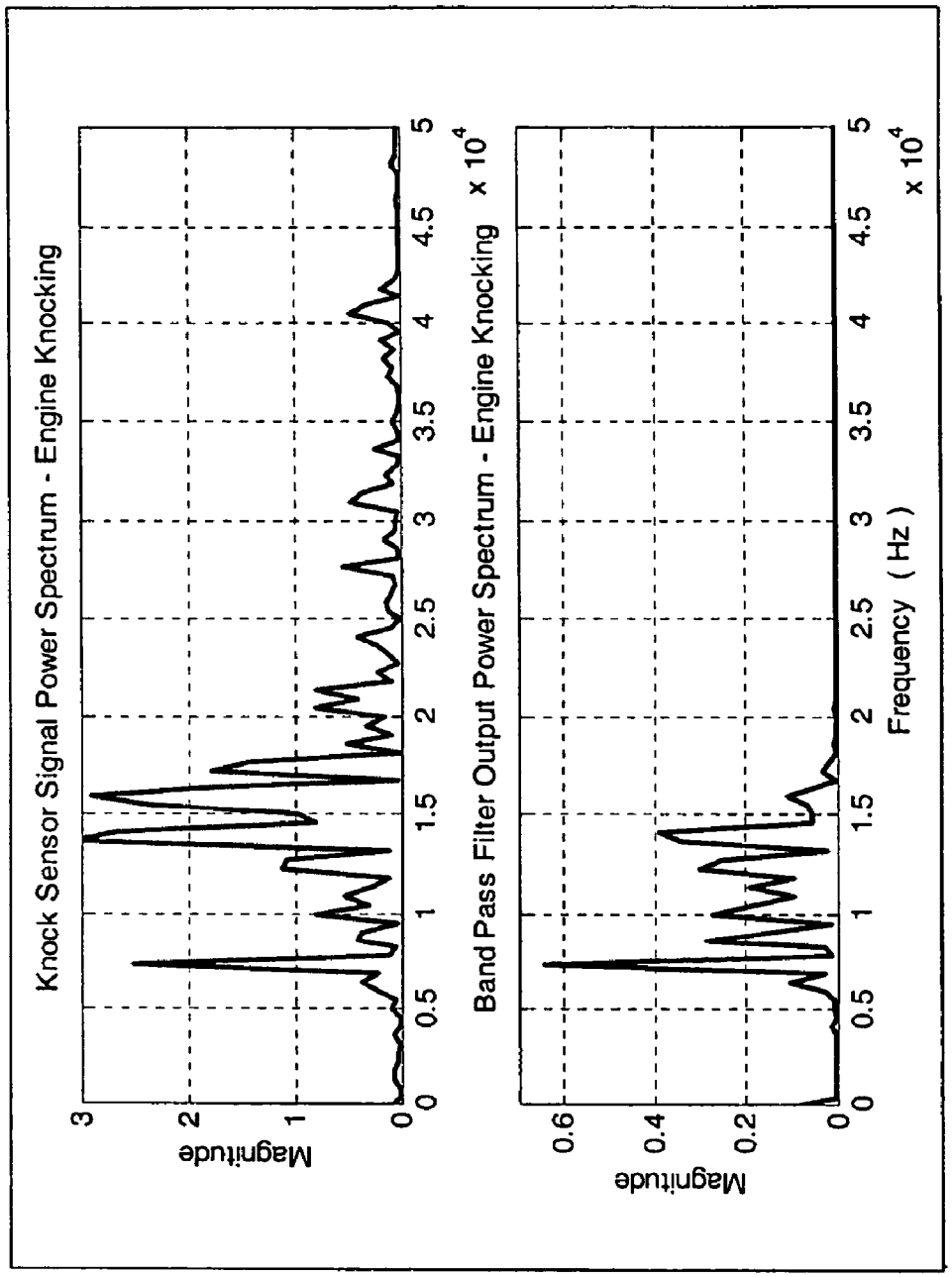
FIG. 8 is a graph illustrating an exemplary knock sensor signal power spectrum and a corresponding exemplary BPF output power spectrum for an engine exhibiting heavy knock.

Referring now to FIG. 4, exemplary modules are illustrated that execute the frequency-domain DSP-based knock detection control according to the present invention. The exemplary modules include a digital filter module, a gain 402, a buffer module 404, a fast-Fourier transform (FFT) module 406, a power module 408, an energy module 410, an intensity module 412, a noise module 414, a diagnostic module 416 and the window and cylinder module 418. The modules further include a multiplexer 420, a filter 422 and an A/D converter 424, as described in detail above.

The digital filter module 400 can be implemented as a BPF using an IIR or FIR filter, as discussed in detail above. Samples of the filtered knock sensor signal are gathered in the buffer module 404 to form a vector of given dimension (e.g., N-dimensional vector). The output of the buffer module 404 can be described as follows:

$$y_b = [y_0\ y_1\ \ldots\ y_N]$$

where $y_b$ is the buffer output, $y_0\ y_1 \ldots y_N$ are samples of the BPF output and N is the number of samples. It is appreciated that while N is preferably based on a power of 2 (e.g., 64, 128, 256, 512, 1023, etc), any number can be used. The output of the buffer module 404 is an N-dimensional vector, that is formed of samples of the filtered knock sensor signal.

The FFT module 406 takes the N-dimensional vector at the output of the buffer module 404 and converts it into frequency domain complex pairs. The FFT function can be described by the following equation:

$$Y_f = FFT(y_b)$$

where $Y_f$ is the output of the FFT module 406 and $y_b$ is the FFT module input. Both $Y_f$ and $y_b$ are vectors, however, $Y_f$ is a complex vector and is obtained from the following equation:

$$Y_f = \sum_{i=1}^{N} y_b(i) w_N^{(i-1)(k-1)}$$

where $w_N = e^{(-2\pi j)/N}$, N is the number of samples in the buffer, k is the number of frequency components and $j=\sqrt{-1}$ is the complex operator.

Each component of the $Y_f$ vector is a pair of real and imaginary numbers. These complex pairs can be described by the following equations:

$$\text{Re}Y_f[k] = \sum_{i=1}^{N} y_b(i) \cos(2\pi ki/N)$$

$$\text{Im}Y_f[k] = -\sum_{i=1}^{N} y_b(i) \sin(2\pi ki/N)$$

where Re $Y_f[k]$ and Im $Y_f[k]$ are the real and imaginary parts of the $Y_f$ vector.

The power module 408 estimates the power spectrum, which is a measurement of the power of each frequency component. The power of each component of the $Y_f$ vector is calculated as follows:

$$PY_f = Y_f * conj(Y_f)/N$$

where $PY_f$ is the power spectrum of $Y_f$, $Y_f$ is the output of the FFT module 406 and $conj(Y_f)$ is the complex conjugate of $Y_f$. The complex conjugate of a complex number (a+jb) is defined as (a−jb).

Although the digital filter module 400 is illustrated, it is anticipated that the frequency domain DSP-based knock detection system does not have to have a digital filter module. If the digital filter module 400 (e.g., BPF) is used, the filter will block frequency components below and above a specified frequency range (e.g., 4 kHz to 20 kHz). Therefore, the power spectrum of the knock signal will show zero power for those components. However, if digital filter module 400 is not used, frequency components below and above the specified frequency range will show up in the power spectrum. That is to say, the power of these components is no longer zero. These additional frequency components will add more data points, but will also add more noise. The digital filter module 400 is used to reject unwanted noise but in doing so it can also delete some useful information.

As discussed in detail with respect to FIGS. 5 through 8 below, the power of the knock signal frequency components increases as the engine knock intensity increases. Therefore engine knock intensity can be estimated by determining the power of these components. In addition, since the energy of the knock signal is the integration (i.e., the summation of a discrete signal) of the power of all its individual frequency components, engine knock intensity can be determined by estimating the energy that the signal has in a given range of frequencies (e.g., 4 kHz to 20 kHz).

In the frequency domain approach, knock intensity can be calculated based on at least one of an energy calculation, a power calculation of select frequencies (e.g., at around 6 kHz and around 15 kHz) and energy and/or power calculation of the knock signal or a portion of the knock signal. For example, the energy (E) of the knock signal obtained by integrating the power spectrum (i.e., summing the power of each frequency component). KI is then determined based on the following equation:

$$KI = E - E_{THR}$$

where $E_{THR}$ is determined from a look-up table based on engine speed and engine load. The look-up table is obtained experimentally from vehicle tests with normal engine operation (i.e., no knock). E is calculated in a given frequency range (e.g., example 4 kHz to 20 kHz).

Fault detection in the frequency-domain is similar to fault detection in the time-domain, discussed in detail above. However, fault detection in the frequency domain is easier and more robust than in the time domain. This is because of the fact that the power spectrum of the knock signal is significantly different when there is a fault in the sensor or circuit. Therefore, besides the level of the signal or total energy, the power among the different frequency components can be compared to detect a short to ground or short to power. For example, if the total energy of the signal or power of its components is below a given lower threshold ($E_{THRLO}$) or above a given higher threshold ($E_{THRHI}$) there is a fault in the knock sensor and/or knock circuit.

Referring now to FIGS. 5 through 8 exemplary knock sensor signal power spectrums and corresponding exemplary BPF output power spectrums are illustrated for a normal engine operating condition (i.e., no knock), for light knock, for medium knock and for heavy knock, respectively. As illustrated, the power spectrums increase as the knock intensity increases.

Both the time-domain and the frequency-domain DSP-based knock detection systems provide similar results. From Parseval's relation, the total energy of a signal can be determined either by computing the energy per unit time and integrating over the complete time (i.e., using the absolute value and integrator blocks) or by computing the energy per unit frequency and integrating (i.e., summing of discrete signals) over all frequencies. Parseval's relation is defined as follows:

$$\int_{-\infty}^{+\infty} |y_a|^2 dt = \frac{1}{2\pi} \int_{-\infty}^{+\infty} |Y_f(jw)|^2 dw$$

where $|y_a|$ is the absolute value of the signal at the output of the BPF, $w=2\pi f$ where f is the frequency of the signal component (e.g., 4 kHz to 20 kHz) and $|Y_f(jw)|^2$ is the power of the signal frequency components obtained from the power spectrum of the knock signal. The left side of the equation is the calculation of the energy in the time-domain and the right side is the calculation of the energy in the frequency domain.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A knock detection system for a spark-ignition engine, comprising:
    a knock sensor that is responsive to vibration of said engine and that generates a knock signal;
    a first module that calculates a knock energy based on said knock signal;
    a second module that calculates a knock intensity based on said knock energy;
    a third module that regulates a spark timing of said engine based on said knock intensity; and
    a window module that generates a window signal, wherein said window signal indicates selected time periods during which knock detection is executed.

2. The knock detection system of claim 1 further comprising a noise module that estimates a noise value, wherein said second module calculates said knock intensity based on said noise value.

3. The knock detection system of claim 1 further comprising a diagnostic module that selectively generates one of a knock sensor fault and a knock circuit fault based on said knock energy.

4. The knock detection system of claim 1 further comprising a Fast Fourier Transform (FFT) module that generates a frequency signal based on said knock signal.

5. The knock detection system of claim 4 further comprising a power module that generates a power signal based on said frequency signal, wherein said knock energy is based on said power signal.

6. The knock detection system of claim 1 wherein said window signal is determined based on a rotational position of a crankshaft of said engine, wherein said knock energy is calculated based on said window signal.

7. The knock detection system of claim 1 wherein said second module determines a knock difference between said knock energy and a noise energy and calculates said knock intensity as a difference between said knock ratio and a knock intensity threshold.

8. The knock detection system of claim 1 wherein said second module determines a knock ratio between said knock energy and a noise energy and calculates said knock intensity as a difference between said knock ratio and a knock intensity threshold.

9. The knock detection system of claim 1 wherein said second module determines said knock intensity as a difference between said knock energy and an energy threshold.

10. A method of detecting engine knock of a spark ignition engine, comprising:
generating a window signal, wherein said window signal indicates selected time periods during which knock detection is executed;
generating a knock signal based on vibration of said engine;
calculating a knock energy based on said knock signal;
calculating a knock intensity based on said knock energy; and
regulating a spark timing of said engine based on said knock intensity.

11. The method of claim 10 further comprising estimating a noise value, wherein said knock intensity is further calculated based on said noise value.

12. The method of claim 10 further comprising generating one of a knock sensor fault and a knock circuit fault based on said knock energy.

13. The method of claim 10 further comprising generating a frequency signal based on said knock signal using a Fast Fourier Transform (FFT).

14. The method of claim 13 further comprising generating a power signal based on said frequency signal, wherein said knock energy is based on said power signal.

15. The method of claim 10 further comprising generating said window signal based on a rotational position of a crankshaft of said engine, wherein said knock energy is calculated based on said window signal.

16. The method of claim 10 further comprising:
determining a knock difference between said knock energy and a noise energy; and
calculating said knock intensity as a difference between said knock ratio and a knock intensity threshold.

17. The method of claim 10 further comprising:
determining a knock ratio between said knock energy and a noise energy; and
calculating said knock intensity as a difference between said knock ratio and a knock intensity threshold.

18. The method of claim 10 further comprising determining said knock intensity as a difference between said knock energy and an energy threshold.

19. A method of detecting engine knock of a spark ignition engine, comprising:
generating a window signal, wherein said window signal indicates selected time periods during which knock detection is executed;
generating a knock signal based on vibration of said engine;
calculating a knock energy based on said knock signal;
calculating a noise signal based of said engine based on a baseline noise signal;
calculating a knock intensity based on said knock energy; and
regulating a spark timing of said engine based on said knock intensity.

20. The method of claim 19 further comprising determining said baseline noise based on a firing order of cylinders of said engine and historical data of noise of said engine.

21. The method of claim 19 further comprising updating said baseline noise based on current operating conditions of said engine.

22. The method of claim 19 further comprising generating one of a knock sensor fault and a knock circuit fault based on said knock energy.

23. The method of claim 19 further comprising generating a frequency signal based on said knock signal using a Fast Fourier Transform (FFT).

24. The method of claim 23 further comprising generating a power signal based on said frequency signal, wherein said knock energy is based on said power signal.

25. The method of claim 19 further comprising generating said window signal based on a rotational position of a crankshaft of said engine, wherein said knock energy is calculated based on said window signal.

26. The method of claim 19 further comprising:
determining a knock difference between said knock energy and a noise energy; and
calculating said knock intensity as a difference between said knock ratio and a knock intensity threshold.

27. The method of claim 19 further comprising:
determining a knock ratio between said knock energy and a noise energy; and
calculating said knock intensity as a difference between said knock ratio and a knock intensity threshold.

28. The method of claim 19 further comprising determining said knock intensity as a difference between said knock energy and an energy threshold.

* * * * *